United States Patent [19]

Barker

[11] Patent Number: 4,766,804

[45] Date of Patent: Aug. 30, 1988

[54] RETAINER ASSEMBLY FOR HYDRAULIC ACTUATOR

[75] Inventor: David C. Barker, Utica, Mich.

[73] Assignee: Automotive Products plc, Warwickshire, England

[21] Appl. No.: 18,273

[22] Filed: Feb. 24, 1987

[51] Int. Cl.$^4$ ............................................. F15B 15/26
[52] U.S. Cl. ........................................ 92/23; 60/533; 60/570; 24/16 PB
[58] Field of Search .................... 60/533, 570; 92/23; 24/16 PB

[56] References Cited

U.S. PATENT DOCUMENTS

| | | | |
|---|---|---|---|
| 4,454,632 | 6/1984 | Nix | 60/684 |
| 4,551,976 | 11/1985 | Nix | 60/533 |
| 4,581,979 | 4/1986 | Compton | 60/533 |
| 4,586,580 | 5/1986 | Spielmann | 60/533 |
| 4,665,802 | 5/1987 | Barker et al. | 60/533 |

Primary Examiner—Abraham Hershkovitz
Attorney, Agent, or Firm—Krass & Young

[57] ABSTRACT

A retainer assembly for use with an hydraulic clutch actuator of the type including a master cylinder and a slave cylinder in fluid communication with one another. The retainer assembly acts to maintain the output member of the slave cylinder in a retracted position during shipment, storage, and vehicular installation of the hydraulic actuator. The assembly includes a rupturable plastic strap having a control socket and connected as a harness over the end of the slave cylinder output rod. The assembly further includes a non-rupturable steel wire positioned over the socket portion of the plastic strap. The free ends of the wire are clipped around the mounting flange of the cylinder body.

9 Claims, 2 Drawing Sheets

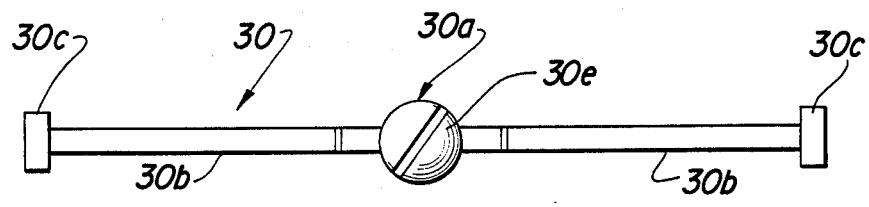
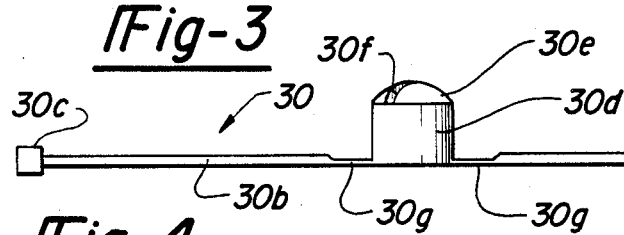
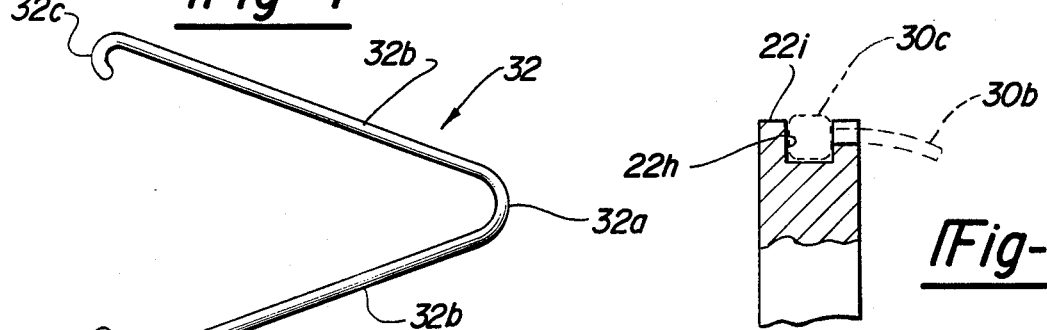
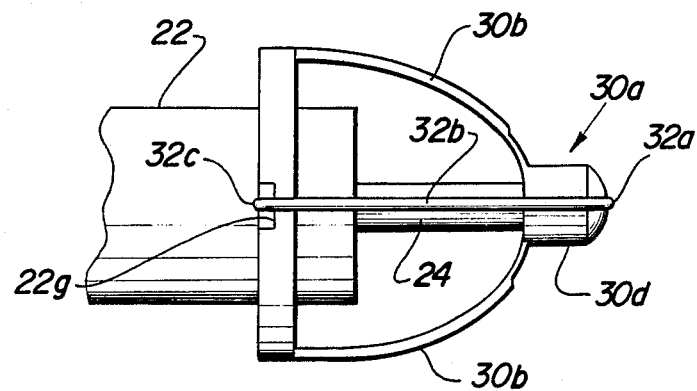
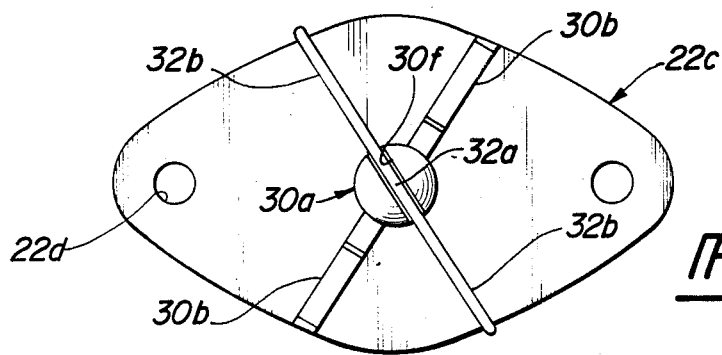

4,766,804

RETAINER ASSEMBLY FOR HYDRAULIC ACTUATOR

BACKGROUND OF THE INVENTION

This invention relates to hydraulic actuators and more particularly to retainer assemblies for use with hydraulic actuators.

Hydraulic actuator apparatus are known for operating a mechanism at a remote location by way of a master cylinder connected to a slave cylinder installed at the remote location. A conduit interconnects the master cylinder and slave cylinder, and the hydraulic apparatus is filled with hydraulic fluid such that, when the piston of the master cylinder is actuated, the piston of the slave cylinder, and consequently the piston rod or output member of the slave cylinder, is simultaneously actuated by displacement of the hydraulic fluid from the master cylinder to the slave cylinder through the conduit.

More particularly, it is known to provide such hydraulic apparatus for operating the release mechanism of a friction clutch. As disclosed in U.S. Pat. No. 4,599,860 assigned to Automotive Products plc. of Warwickshire, England, it is also known to preassemble friction clutch hydraulic release apparatus by filling the master cylinder, the slave cylinder and the interconnecting conduit with hydraulic fluid prior to shipment of the assembly to a motor vehicle manufacturer for installation on the motor vehicle.

Prior to installation on the motor vehicle, the piston rod or output member of the slave cylinder may become extended. Such pre-installation extension is undesirable since the extended slave cylinder now occupies more space than necessary in the shipping container, since the extended rod may become bent or damaged or become disconnected from the piston during transit or storage, since the pressure of the fluid in the apparatus may drop below atmospheric with the result that air may be introduced into the apparatus, and since the slave cylinder must be manually retracted and held retracted during installation of the apparatus in the motor vehicle.

In order to avoid all of these problems related to inadvertent extension of the output member of the slave cylinder prior to installation in the motor vehicle, it has been proposed to provide a rupturable shipping strap for the slave cylinder which maintains the output mmber of the slave cylinder in a retracted position until the slave cylinder is installed in the motor vehicle, whereafter the master cylinder is actuated to pressurize the system and extend the output member of the slave cylinder to rupture the shipping strap. A shipping strap of this general type is disclosed in U.S. Pat. No. 4,454,632, also assigned to Automotive Products plc. In order to avoid inadvertent rupture of the shipping strap prior to installation in the vehicle as a result of inadvertent actuation of the master cylinder, it has been proposed to provide a restraining clip for installation on the piston rod of the master cylinder to prevent accidental operation during shipping and installation. Such a clip, which is removed at such time as the installation of the slave cylinder in the vehicle has been completed to allow the system to be thereafter actuated to rupture the shipping strap, is shown in U.S. Pat. No. 4,581,979, also assigned to Automotive Products plc.

There are some situations, however, in which the use of such a restraining clip on the master cylinder piston rod is not feasible. For example, when a control switch assembly is positioned on the master cylinder piston rod to selectively control various systems of the vehicle in response to actuation of the master cylinder piston rod, it is no longer possible to employ a restraining clip on the master cylinder piston rod and it becomes necessary to provide other means to prevent inadvertent operation of the master cylinder, with resultant rupture of the shipping strap, prior to installation of the slave cylinder in the motor vehicle.

SUMMARY OF THE INVENTION

The present invention is directed to the provision of a retainer assembly for use with a hydraulic apparatus of the type including a prefilled master cylinder, slave cylinder, and interconnecting conduit.

More particularly, the present invention is directed to the provision of a retainer assembly for the slave cylinder of such a hydraulic apparatus which functions to maintain the output member of the slave cylinder in a retracted position during shipment and prior to installation in the motor vehicle but which ruptures in response to pressurization of the system to allow final assembly of the system in the motor vehicle.

The invention retainer assembly is adapted for use with a slave cylinder of the type including a cylinder housing defining a pressure chamber containing a hydraulic liquid; a piston slidably positioned in the pressure chamber; and an output member connected to the piston and projecting out of an end of the housing to define a free end outside of the housing, the output member having a retracted position and movable in response to pressurization of the chamber to an extended position. The retainer assembly according to the invention comprises a non-rupturable strap releasably connected between the output member and the housing and operative to maintain the output member in its retracted position even upon pressurization of the chamber, and a rupturable strap secured to the output member and to the housing and operative to maintain the output member in its retracted position but rupturable in response to pressurization of the chamber to allow the output member to move to its extended position. This arrangement allows the prefilled master and slave cylinder apparatus to be shipped and stored prior to assembly without danger of inadvertent actuation of the master cylinder of the system with consequent rupture of the rupturable strap on the slave cylinder, allows the master cylinder of the apparatus to be installed in the motor vehicle and connected to the clutch pedal of the vehicle at a relatively early stage in the vehicular assembly process without danger of subsequent inadvertant actuation of the master cylinder by inadvertant depression of the clutch pedal, and allows the non-rupturable strap to be removed prior to final assembly of the slave cylinder in the vehicle at a relatively late stage in the assembly process so that the rupturable strap will be ruptured in response to the first actuation of the system following installation of the slave cylinder.

According to a further feature of the invention, the non-rupturable strap comprises a metal wire and the rupturable strap is formed of plastic. This arrangement provides a convenient and inexpensive means of providing the non-rupturable and rupturable aspects of the retainer assembly.

According to a further feature of the invention, the non-rupturable strap is releasably secured at one end to the housing at a first point on the housing, extends over the free end of the output member of the slave cylinder, and is releasably secured at its other end to a second point on the housing generally diametrically opposed to the first point. This arrangement provides a convenient and effective means of mounting the non-rupturable strap on the cylinder housing.

According to a further feature of the invention, the rupturable strap is secured at one end to the housing at a third point on the housing between the points of attachment of the non-rupturable strap and is secured at its other end on the housing at a further point generally diametrically opposed to the point of securement of the first end of the rupturable strap. This arrangement provides a crossed or X configuration for the rupturable and non-rupturable straps to facilitate installation of both of the straps on the housing.

According to a further feature of the invention, the rupturable strap includes a weakened portion to facilitate rupture of the rupturable strap in response to pressurization of the chamber.

According to a further feature of the invention, the rupturable strap includes a socket portion fitted over the free end of the output member; the socket portion includes a diametric groove; and the non-rupturable strap is positioned in the diametric groove of the socket portion of the rupturable strap. This arrangement allows convenient positioning of the rupturable member on the output member and of the non-rupturable member on the rupturable member.

According to a further feature of the invention, the non-rupturable strap has a shorter effective length than the rupturable strap so that the non-rupturable strap is tensioned upon pressurization of the chamber and the rupturable strap remains in an untensioned, standby condition until the non-rupturable strap is removed.

BRIEF DESCRIPTION OF THE DRAWINGS

FIG. 3 is a plan view of a rupturable retainer strap employed in the retainer assembly of the invention;

FIG. 4 is a side elevational view of the retaining strap of FIG. 3;

FIG. 5 is a view of a non-rupturable retaining strap employed in the retaining assembly of the invention;

FIG. 6 is a fragmentary view showing the assembled relation of the retaining straps of the invention retaining assembly;

FIG. 7 is a further view showing the assembled relation of the retaining straps of the invention retaining assembly and FIG. 8 is a fragmentary view showing details of the mounting of the rupturable retaining strap.

DETAILED DESCRIPTION OF THE PREFERRED EMBODIMENT

Figure 1:
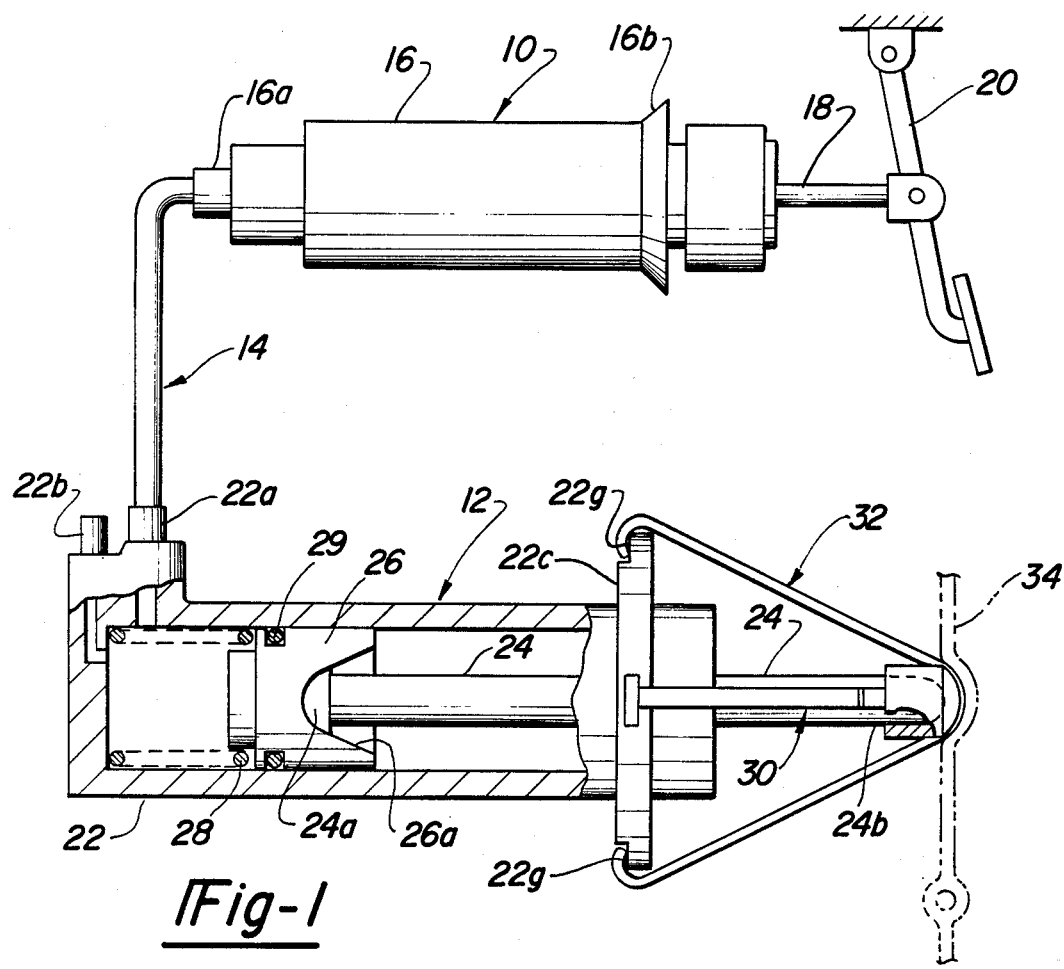
FIG. 1 is a somewhat schematic view of a hydraulic actuator assembly employing the retainer assembly of the invention.
Figure 2:
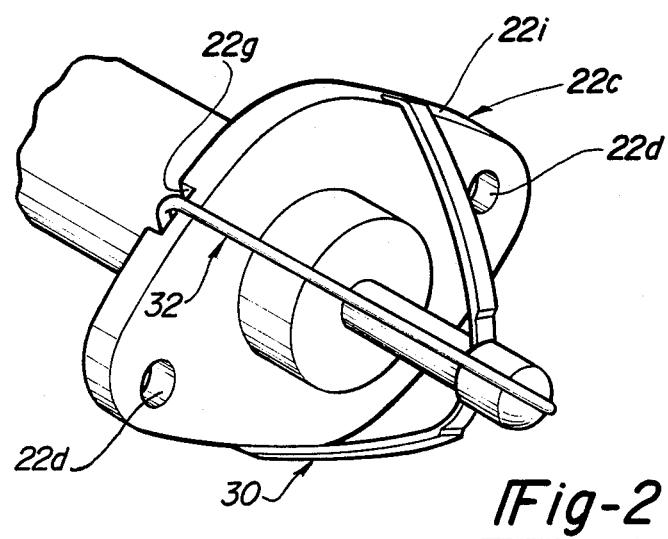
FIG. 2 is a fragmentary perspective view showing details of the invention retainer assembly.

The actuator assembly seen in FIG. 1 includes a master cylinder 10, a slave cylinder 12, and a conduit 14.

Master cylinder 10 is of known form and includes a cylinder 16 and an output member or piston rod 18. Cylinder 16 includes an output port 16a and a flange 16b to facilitate mounting of the cylinder on a suitable bulkhead of an associated vehicle. Input member 18 is pivotally secured at one end to a clutch operating lever 20 of the associated vehicle and is connected at its other end within cylinder 16 to the piston of the cylinder. It will be understood that master cylinder 10 will be connected in known manner to a reservoir for hydraulic fluid, and that the reservoir may be built either integrally with the cylinder or be located remotely with respect to the cylinder.

Slave cylinder 12 includes a cylinder 22 and an output member or piston rod 24. Cylinder 22 defines an input port 22a, a bleed port 22b, and a flange 22c including mounting holes 22d for attachment of the slave cylinder to a suitable bulkhead of the associated vehicle. Output member 24 is suitably connected at one end 24a in a socket 26a defined in a piston 26 slidably positioned in the pressure chamber 22e of cylinder 22. The other end 24b of output member 24 is rounded and positioned externally of the cylinder 22. A compression spring 28 positioned within pressure chamber 22e extends between piston 26 and the input end 22f of cylinder 22 and acts to urge the piston and the output member to an extended position with respect to cylinder 22, and an annular seal 29 slidably seals piston 26 with respect to cylinder 22.

The retainer assembly of the invention includes a rupturable strap 30 and a non-rupturable strap 32.

Strap 30 is formed of a suitable plastic material, such as a polyamide, and includes a central socket portion 30a, arm portions 30b, and lug portions 30c.

Socket portion 30a is generally cup shaped and is sized to fit over the rounded end 24b of output member 24 and includes a cylindrical wall portion 30d and a dome portion 30e. A diametric slot 30f extends across dome portion 30e. Arm portions 30b are of flat or ribbon configuration and include reduced thickness weakened portions 30g adjacent their respective juncture with socket portion 30a. Lug portions 30c form a T-configuration with associated arm portions 30b and have an enlarged width as well as an enlarged thickness as compared to the associated arm portions 30b.

Non-rupturable strap 32 is preferably formed as a high carbon spring steel metal wire which is formed into a generally wishbone configuration with a central arcuate portion 32a, arm portions 32b, and hook end portions 32c.

Flange portion 22c of slave cylinder 12 is especially configured to receive straps 30 and 32 and, specifically, includes a pair of diametrically opposed cutouts 22g formed in the rear outer edges of the flange portion, and a pair of diametrically opposed recesses 22h extending inwardly from the outer edge 22i of the flange portion. Recesses 22h have a T-configuration generally corresponding to the T-configuration formed by the outer end of each arm portion 30b of strap 30 and the associated lug portion 30c. The diametrically opposed recesses 22g and the diametrically opposed recesses 22a are shown at various relative and absolute positions around the flange portion 22c in the various Figures since their relative and absolute positions around the flange portions are not critical to the exercise of the invention.

In the assembled relation of the retainer assembly of the invention, socket portion 30e of strap 30 is fitted slidably over the rounded end 24b of output member 24; arm portions 30b extend rearwardly from socket portion 30a; lug portions 30c are received in diametrically opposed recesses 22h; arcuate portion 32a of strap 32 is fitted in diametric groove 30f in socket 30a; arm portions 32b extend rearwardly from arcuate portion 32a; and hook portions 32c engage in recesses 22g on the flange portion of the slave cylinder. As best seen in FIG. 6, the straps 30 and 32 are relatively dimensioned such that the arm portions 30b of strap 30 are held in a slightly bowed configuration by the strap 32. That is, with both straps in place, strap 32 maintains rod 24 in its retracted position against the bias of spring 28 and strap 30 is held in a reserve or standby condition.

In use of the invention retainer assembly, straps 30 and 32 are both applied to the slave cylinder at the time that the prefilled hydraulic actuator assembly comprising master cylinder 10, slave cylinder 12, and conduit 14 are prepared at the manufacturing facility. The straps act to hold the input member 24 in its retracted position with the actual stress loading being carried by retainer 32 in so long as retainer 32 is in place. During shipment of the prefilled assembly, and during the time between installation of the master cylinder in the associated vehicle and the later installation of the slave cylinder in the vehicle, the strap 32 operates to prevent extension of the output member of the slave cylinder as a result of inadvertent actuation of the master cylinder resulting, for example, from inadvertent depression of the clutch pedal of the vehicle. Immediately prior to the installation of the slave cylinder in the vehicle to position the free end 24b of output member 24 with respect to the clutch release lever 34, non-rupturable strap 32 is removed from the assembly by the installer, whereupon spring 28 acts to move piston 26 and output member 24 outwardly with respect to cylinder 22 to take up the slack or bow in rupturable strap 30 so that the rupturable strap now functions to maintain the output rod 24 in its retracted position.

When the clutch pedal is operated following installation of the slave cylinder in the motor vehicle and positioning of the free end 24b of of output member 24 against the clutch release lever 34, pressurized fluid is delivered from the master cylinder to the slave cylinder, and arm portions 30b of the strap 30 rupture at weakened portions 30g to allow the output member to extend to its fully extended position, thus permitting subsequent normal operation of the vehicular clutch assembly.

The invention retainer strap assembly will be seen to provide a simple and inexpensive device which functions to preclude accidental actuation of the hydraulic apparatus during shipment and storage of the apparatus and during the initial vehicular installation process, and which further functions to provide a means for temporarily retaining the output member of the slave cylinder in a retracted position following the final assembly of the slave cylinder in the vehicle while yet allowing the clutch assembly to operate in a normal manner upon actuation of the system.

Whereas a preferred embodiment of the invention has been illustrated and described in detail, it will be apparent that various changes can be made in the disclosed embodiment without departing from the scope or spirit of the invention.

I claim:

1. A cylinder assembly for use as the slave cylinder in a hydraulic apparatus of the type including a prefilled master cylinder, a slave cylinder, and an interconnecting conduit, said cylinder assembly comprising:
   (A) a cylinder housing defining a pressure chamber for containing a hydraulic fluid;
   (B) a piston slidably positioned in said pressure chamber;
   (C) an output member connected to said piston and projecting out of an end of said housing to define a free end outside of said housing, said output member having a retracted position and movable in response to pressurization of said chamber to an extended position;
   (D) a non-rupturable strap releasably connect between said output member and said housing and operative to maintain said output member in its retracted position even upon pressurization of said chamber; and
   (E) a rupturable strap secured at one end thereof to said housing at a first point on said housing, extending over said free end of said output member, and secured at its other end to a second point on said housing circumferentially spaced from said first point, said rupturable strap being operative to maintain said output member in its retracted position but rupturable in response to pressurization of said chamber to allow said output member to move to an extended position following release of said non-rupturable strap.

2. A cylinder assembly according to claim 1 wherein:
   (F) said non-rupturable strap comprises a metal wire; and
   (G) said rupturable strap is formed of plastic.

3. A cylinder assembly according to claim 1 wherein:
   (F) said non-rupturable strap is releasably secured at one end to said hosuing at a third point on said housing, extends over said free end of said output member, and is releasably secured at its other end to a fourth point on said housing generally diametrically opposed to said third point and circumferentially spaced from said first and second points.

4. A cylinder assembly to claim 1 wherein:
   (G) said first point on said housing is generally diametrically opposed to said second point on said housing.

5. A cylinder assembly according to claim 1 wherein:
   (F) said non-rupturable strap is releasably secured at one end to said housing at a third point on said housing, extends over said free end of said output member, and is releasably secured at its other end to a fourth point on said housing generally diametrically opposed to said third point;
   (G) said first point is positioned circumferentially between said third and fourth points and said second point is generally diametrically opposed to said first point.

6. A cylinder assembly according to claim 5 wherein:
   (H) said rupturable strap includes a weakened portion to facilitate rupture thereof in response to pressurization of said chamber.

7. A cylinder assembly according to claim 5 wherein:
   (H) said rupturable strap includes a socket portion adapted to fit over the free end of said output member;
   (I) said socket portion includes a diametric groove; and
   (J) said non-rupturable strap is positioned in said groove.

8. A cylinder assembly according to claim 1 wherein:
   (F) said non-rupturable strap has a shorter effective length than said rupturable strap so that said non-rupturable strap is tensioned upon pressurization of said chamber and said rupturable strap remains in an untensioned, stand-by condition until said non-rupturable strap is removed.

9. A hydraulic actuator comprising:

(A) a cylinder housing defining a pressure chamber for containing hydraulic fluid;
(B) a piston axially slidably positioned in said pressure chamber;
(C) an output member connected to said piston and projecting out of the forward end of said housing to define a free forward end outside of said housing, said output member having a rearwardly retracted position and movable axially in response to pressurization of said chamber to a forwardly extended position;
(D) a rupturable plastic strap including a socket portion fitted over the free forward end of said output member and arm portions extending rearwardly from said socket portion to generally diametrically opposed points on said housing, said socket portion having a diametric groove therein and the rearward ends of said arm portions being secured to said housing in a manner to preclude forward axial movement of said arm portions relative to said housing; and
(E) a wire releasably secured at one end to said housing at a point circumferentially between said diametrically opposed points, extending over the free forward end of said output member within said diametric groove, and secured at its other end to said housing at a point generally diametrically opposed to the point of attachment of said one end thereof to said housing.

* * * * *